Patented Nov. 23, 1926.

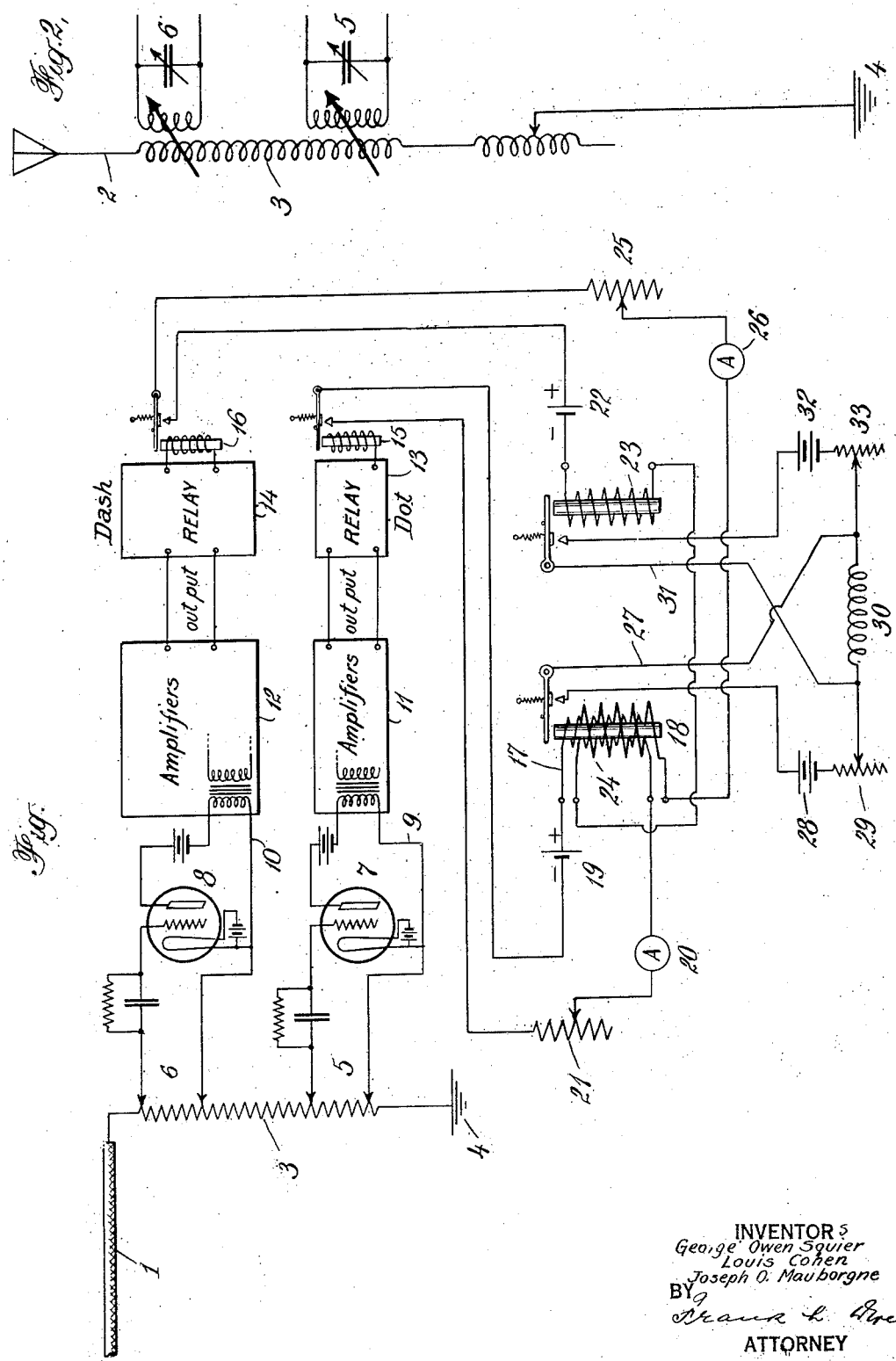

1,608,252

UNITED STATES PATENT OFFICE.

GEORGE O. SQUIER, OF THE UNITED STATES ARMY; LOUIS COHEN, OF WASHINGTON, DISTRICT OF COLUMBIA; AND JOSEPH O. MAUBORGNE, OF THE UNITED STATES ARMY.

APPARATUS FOR EFFECTING ELECTRICAL SIGNALING.

Application filed January 15, 1924. Serial No. 686,304.

Our invention relates to improvements in electrical signaling, and our object is to increase the speed at which such signals may be transmitted and received. Our improvements are applicable to cable telegraphy, to wire telegraphy, and to radio telegraphy. In signaling by our improved apparatus we utilize variations in amplitude of the currents employed to distinguish the dots and dashes constituting the message, whereby the time required to transmit a dash will be the same as that required to transmit a dot. We may utilize either direct or alternating currents in carrying our invention into effect in connection with cables or land wires. When a direct current is employed, the dots and dashes are constituted by current pulses of greater or smaller amplitude. For cable telegraphy, if alternating currents are to be used, they are of low frequency, of the order of ten to twenty cycles per second, and suitable commutating devices are employed, so that by means of a suitable sending tape each half cycle may represent a dot or dash or a space. A suitable resistance in the alternating circuit is properly controlled to give the maximum voltage in the case of a dash, a smaller voltage in the case of a dot, and a still smaller or no voltage in the case of a space. For radio telegraphy, either spark signals or continuous waves may be employed suitably controlled to give the desired voltage differences at the receiving station to distinguish the dots from the dashes. For instance, with a spark transmitter greater energy may be transmitted from the antenna in the case of a dash than in the case of a dot; in the case of continuous waves the latter may be suitably modulated to represent the desired variations in amplitude corresponding to the signal. We do not claim herein the particular method or apparatus for generating the required signals at the transmitting end; it is only necessary that the respective dots and dashes which constitute the signal shall vary in amplitude but not in time, this variation being impressed either upon a continuous current or upon an alternating current, or upon high frequency radiated waves, either damped or undamped.

Our present invention relates particularly to the apparatus used for the reception of the signals referred to. We utilize for this purpose two receiving circuits, one adapted to receive dots and the other to receive dashes. These circuits are so organized that one of them alone becomes operative when a signal of one kind, for instance a dot, is received, while when a different signal, for instance, a dash, is received, both circuits become operative. This selective action of the receiving circuits may be effected in a variety of ways. For example, they may be of different orders of sensitiveness, whereby the dash circuit will be unresponsive to the weaker dot signals, whereas both circuits will be responsive to the stronger dash signals. Instead, the two receiving circuits may be of equal sensitiveness but be so related to the incoming signals that the dot circuit will absorb greater energy than the dash circuit, whereby the former will be operated by the relatively weak signals representing dots, while both circuits will be operated by the relatively strong signals representing dashes. This variation in energy absorption of the two circuits can be accomplished by either coupling the two circuits directly to the line in such a way that the potentials applied to the respective circuits are different, to thus secure the required selection, or instead the two circuits may be inductively or otherwise coupled to the line to secure the same result.

We preferably employ in each of the selective receiving circuits an audion detector by means of which the received signals will be detected as current variations in the output circuit thereof and by means of suitable vacuum tube amplifiers coupled to the respective detectors the signals thus received will be amplified to the proper value. Having thus amplified the signals in the respective selecting circuits we apply them to separate relays controlling suitable local circuits. Any suitable sensitive relay may be employed for the purpose, but we prefer to make use of a special type of highly sensitive relay described in a paper by F. W. Dunmore in the Journal of the American Institute of Electrical Engineers, for April, 1922, said relay employing a vacuum tube whose grid is biased by a negative potential whereby normally no current flows in the plate circuit. The relay corresponding to the selective receiving circuit responsive to signals of low amplitude, for instance dots, controls a local circuit in which is included a differential relay which in turn controls a local circuit, including the coil of a suitable indicator or recorder. This may be any device for indicating or recording the signals, such for example as a siphon recorder or a suitable printer. The relay which is associated with the other selective receiving circuit is adapted to close a local circuit in which is located a simple control relay as well as the second winding of the differential relay whereby when the local circuit is closed its control relay will be operated while the energizing effect due to the operation of the dot circuit on the differential relay will be neutralized. The action of the simple control relay will close a second local circuit including the same coil of the indicator or recorder. The respective local circuits which thus energize the recorder or indicator coil will include adjustable electromotive forces or variable resistances, or both, to vary the currents sent through the recorder or indicator, whereby the response of the recorder or indicator coil to the dots and dashes may be of the proper ratio to effectively distinguish the signals.

In order that our invention may be better understood, attention is directed to the accompanying drawing forming a part of this specification, and in which:

Fig. 1 represents a diagram showing a suitable circuit arrangement for carrying our invention into effect in connection with cable or line telegraphy, the selective circuits being directly connected to the line by a resistance or inductance to secure the desired voltage drop in the respective circuits; and Fig. 2, a diagram showing a wireless receiving antenna, the selective circuits being inductively coupled thereto, thus permitting the desired differences in energy absorption to be secured whereby the receiving circuits and their various instrumentalities may be of equal sensitiveness.

In Fig. 1 the line is illustrated as a cable 1, submarine or otherwise, but it will be understood that this may be an ordinary land wire or a receiving antenna 2 as in Fig. 2. At the receiving station the circuit includes an element 3 which may be either a non-inductive resistance or an inductance coil, the line being grounded at 4. Connected to the resistance or inductance 3 are two selective circuits 5 and 6, the former receiving dots and the latter dashes. As shown, the connection is such as to secure a voltage drop across the connections of the two selective circuits whereby voltage changes due to the signals will be impressed upon the grids of detectors 7 and 8, respectively. These detectors are of the ordinary three electrode type. The two selective circuits 5 and 6 are so coordinated with the line as to be responsive to the changes in amplitude distinguishing the signals. In Fig. 1 it is assumed that the circuit 5 is more sensitive than the circuit 6, whereby the former will respond to the currents of lower amplitude representing dots, while the latter will respond only to the currents of larger amplitude representing dashes.

The relative sensitiveness of the circuits can be adjusted in any suitable way. In Fig. 2, the selective circuits are illustrated as being coupled inductively to the inductance coil 3', the desired selectivity of the circuits being adjusted by varying the coupling in the usual way. With the arrangement of Fig. 2, both circuits may be of equal sensitiveness, the coupling of the circuit 5 being adjusted so that this circuit will absorb greater energy from the line than the circuit 6. In Fig. 1 it will be possible to provide for a larger potential drop across the terminals of the circuit 5 so as to make this circuit more responsive than the circuit 6 and in this case also both the selective circuits may be of equal sensitiveness.

The output circuits 9 and 10 of the detectors 7 and 8, respectively, are connected with suitable amplifiers 11 and 12 respectively, of the thermionic type. Any desired number of stages of such amplifiers may be used to raise the incoming signals to the desired value. Associated with the circuits 5 and 6 are relays 13 and 14 respectively which are preferably Dunmore relays, above referred to. We do not illustrate the details of these relays but show only the actuating coils 15 and 16 thereof. By using audion detectors and thermionic amplifiers and Dunmore relays we find that a very satisfactory response at the coils 15 and 16 can be secured when the received signals are extremely minute.

The contacts of the relay 13—15 control a local circuit including the coil 17 of a differential relay 18. In this local circuit is a battery 19, and we illustrate a milliammeter 20 in this circuit, although of course this element may be omitted. The local circuit also includes an adjustable resistance 21 by which the current in the local circuit may be suitably controlled.

The contacts of the relay 14—16 control a local circuit in which is located a battery 22, a control relay 23, and a coil 24 on the differential relay opposing the effect of the coil 17 thereon. This local circuit also includes a variable resistance 25 by means of which the current therein may be properly controlled. A milliammeter 26 is also shown in this circuit.

The differential relay 18 controls contacts in a local circuit 27 including a battery 28 and a variable resistance 29, said local circuit also including a coil 30 of a suitable indicating or recording device, such as a siphon recorder or printer. The contacts of the control relay 23 control a local circuit 31 which includes a battery 32 and a variable resistance 33. The local circuit 31 also includes the coil 30 of the indicating or recording device.

In operation, assuming the signal to be received to be a dot represented by a current of smaller amplitude, this will be selected by the receiving circuit 5, the other selective circuit 6 being unresponsive thereto by reason of its inferior sensitiveness or otherwise as above explained. The voltage change in the circuit 5 due to the signal received will be impressed upon the grid of the detector 7 resulting in a current flow in the output circuit 9, which by means of the amplifiers 11, will be raised to the proper value to actuate the coil 15 of the relay 13. This will close the contact of the local circuit including the coil 17 of the differential relay and will result in closing the local circuit 27 of the indicating or recording device, giving a response therein corresponding to the dot, this being determined by properly adjusting the local circuit 27. In case a dash signal is received the energy will be sufficient to operate the detector 8 of the selective circuit 6, causing the relay coil 16 to be energized and closing the local circuit to the control relay 23. The energy of the dash signal will also be detected at the detector 7 and will result in the operation of the relay coil 15, but since the two differential coils 17 and 24 on the differential relay oppose each other the closing of the relay circuit when a dash signal is received will neutralize the current in the coil 17 due to the operation of the relay magnet 15 and hence the differential relay will not be operative. It will, of course, be understood that the local circuit of the coil 15 is adjusted to secure proper operation of the differential relay and that the local circuit of the relay coil 16 will be adjusted so as to bring about the proper neutralizing effect referred to when the dash signal is received.

The control relay 23 when operated closes the local circuit 31 and brings about a response in the receiving coil 30 of the indicating or recording device corresponding to the dash signal. The currents in the two circuits 27 and 31, respectively, can be adjusted so as to secure at the indicating or recording device any differences desired in the response to the dots and dashes of the signal; that is to say, while the signals themselves may differ from each other by comparatively small amounts, the response at the indicating and recording device may be several times as large for one as for the other.

Having now described our invention, what we claim as new therein, and desire to secure by Letters Patent is as follows:

1. Apparatus for receiving telegraphic signals where the dots are distinguished from the dashes by variations in amplitude, comprising in combination selective circuits in which the respective signals are received, separate relays operated by the respective signals, one corresponding to the dots and the other to the dashes, and a common receiving device controlled by said relays giving an indication dependent upon the signal received, substantially as set forth.

2. Apparatus for receiving telegraphic signals where the dots are distinguished from the dashes by variations in amplitude, comprising in combination selective circuits for receiving the respective signals, means for amplifying the received signals, separate relays operated by the amplified signals, one corresponding to the dots and the other to the dashes, and a common receiving device controlled by said relays giving an indication dependent upon the signal received, substantially as set forth.

3. Apparatus for receiving telegraphic signals where the dots are distinguished from the dashes by variations in amplitude, comprising in combination a selective circuit operated both by the signals of smaller amplitude and the signals of larger amplitude, a second selective circuit operated only by the signals of larger amplitude, an indicating device controlled from the first selective circuit whereby an indication corresponding to one signal will be secured, said indicating device being also operated by the joint action of both selective circuits whereby a different indication will be secured, substantially as set forth.

4. Apparatus for receiving telegraphic signals where the dots are distinguished from the dashes by variations in amplitude, comprising in combination a selective receiving circuit operated by the signals of lower amplitude, a differential relay controlled therefrom, an indicating device controlled from said differential relay to give an indication therein corresponding to the signals of lower amplitude, a second selective circuit operated by the signals of larger amplitude, which signals also operate the first selective circuit, a relay controlled from the second selective circuit and neutralizing the effect of the first selective circuit on the differential relay, said relay controlling the indicating device to give a different indication therein corresponding to the signals of larger amplitude, substantially as set forth.

5. Apparatus for receiving telegraphic signals where the dots are distinguished from the dashes by variations in amplitude, consisting in combination of a selective circuit operated by the signals of lower amplitude, means for amplifying said signals, an indicating device controlled by the amplified signals to give an indication corresponding to the signals of lower amplitude, a second selective circuit operated by the currents of larger amplitude, said currents also operating the first selective circuit, means for amplifying the signals in the second selective circuit, an indicating device controlled by the latter amplified signals to give an indication corresponding thereto, and means whereby the amplified signals in the second selective circuit neutralize the effect on the indicator of the signals of the first selective circuit, substantially as set forth.

6. Apparatus for receiving telegraphic signals where the dots are distinguished from the dashes by variations in amplitude, comprising in combination a selective circuit operated by the signals of lower amplitude, an indicating device controlled by said signals to give an indication corresponding to the same, a second selective circuit operated by the signals of larger amplitude, said signals also operating the first selective circuit, means whereby the signals of larger amplitude control the indicating device to give an indication therein corresponding to said signals, and means whereby the signals of the second selective circuit neutralize the effect of the signals in the first selective circuit on the indicating device, substantially as set forth.

7. An apparatus for receiving signals where the dots are distinguished from the dashes by differences in amplitude, a receiving circuit, two selective circuits associated therewith, one selecting the signals of lower amplitude and the other the signals of larger amplitude, and means whereby a common indicating device is controlled from the two selective circuits to give an indication corresponding to the respective signals, substantially as set forth.

8. An apparatus for receiving signals where the dots are distinguished from the dashes by differences in amplitude, a receiving circuit, two selective circuits associated therewith for receiving the respective signals, means for amplifying the signals received in the respective selective circuits, and means whereby the amplified signals may control a common indicating device to give indications therein corresponding to the respective signals, substantially as set forth.

9. An apparatus for receiving signals where the dots are distinguished from the dashes by differences in amplitude, a line, two selective circuits associated with the line for receiving the respective signals, a relay for each selective circuit, and means whereby said relays will control a common indicating device to give an indication corresponding to the respective signals, substantially as set forth.

10. An apparatus for receiving signals where the dots are distinguished from the dashes by differences in amplitude, a line, two selective circuits associated therewith, a relay for each selective circuit, a differential relay controlled by one of said relays, a simple relay controlled by the relay in the other selective circuit, means whereby the effect of the differential relay is neutralized when the second selective circuit is operated, and a common indicating device under the control of the differential and simple relays for giving indications corresponding to the respective signals, substantially as set forth.

11. An apparatus for receiving signals where the dots are distinguished from the dashes by differences in amplitude, a line, two selective circuits associated with said line whereby the signals of lower amplitude will operate one selective signal, while the signals of larger amplitude will operate both selective circuits, means whereby the signals in the selective circuits will control an indicating device to give indications corresponding to the respective signals, and means whereby the signals in the second selective circuit will neutralize the effect on the indicating device of the signals in the first selective circuit, substantially as set forth.

12. An apparatus for receiving signals where the dots are distinguished from the dashes by differences in amplitude, a line, two selective circuits associated therewith for receiving the respective signals, a detector in each selective circuit, and means whereby the detected signals in the two selective circuits will control a common indicating device to give indications corresponding to the respective signals, substantially as set forth.

13. An apparatus for receiving signals where the dots are distinguished from the dashes by differences in amplitude, a line, two selective receiving circuits associated with said line, an audion detector in each selective circuit whereby an amplified plate current corresponding to the respective signals will be produced in each circuit, and means whereby the plate currents of the two detectors will control a common indicating device to give indications corresponding to the respective signals, substantially as set forth.

This specification signed by GEORGE O. SQUIER and LOUIS COHEN this 13th day of December, 1923, and by JOSEPH O. MAUBORGNE this 14th day of December, 1923.

GEORGE O. SQUIER.
LOUIS COHEN.
JOSEPH O. MAUBORGNE.